(12) United States Patent
Khan

(10) Patent No.: US 6,209,978 B1
(45) Date of Patent: Apr. 3, 2001

(54) WASTE ORGANIZING CABINET

(76) Inventor: Ghulam Murtaza Khan, 2306 W. Howard Ave., Milwaukee, WI (US) 53221

( * ) Notice: Subject to any disclaimer, the term of this patent is extended or adjusted under 35 U.S.C. 154(b) by 0 days.

(21) Appl. No.: 09/368,524

(22) Filed: Aug. 5, 1999

(51) Int. Cl.$^7$ .................................................. A47B 88/20

(52) U.S. Cl. ................... 312/330.1; 312/301; 312/270.3

(58) Field of Search ............................ 312/330.1, 270.1, 312/270.3, 273, 274, 212, 290, 328, 301, 304, 334.1, 334.13, 348.3, 348.4; 220/500, 909, 23.4

(56) References Cited

U.S. PATENT DOCUMENTS

| | | | |
|---|---|---|---|
| 1,993,477 | * | 3/1935 | Gourley et al. ....................... 312/301 |
| 2,826,475 | * | 3/1958 | Larson ............................... 312/330.1 |
| 2,950,158 | * | 8/1960 | Harmon ........................ 312/330.1 X |
| 3,325,236 | * | 6/1967 | Lustig .............................. 312/304 X |
| 3,528,718 | * | 9/1970 | Johson et al. ................. 312/270.3 X |
| 4,118,081 | * | 10/1978 | Barrientos ............................ 312/328 |
| 4,653,818 | * | 3/1987 | DeBruyn .......................... 312/301 X |
| 5,218,782 | | 6/1993 | Null et al. . |
| 5,221,010 | | 6/1993 | Bianco ................................. 209/702 |
| 5,503,287 | | 4/1996 | Gammons et al. ................. 220/4.11 |
| 5,938,305 | * | 8/1999 | Rubsam-Tomlinson ...... 312/330.1 X |

OTHER PUBLICATIONS

Bear Product Catalog: Cabinet & Counter Accessories; pp. F–628, Oct. 1996.*
C.H. Briggs Hardware Co.; Product Brochure, pp. D15–16 & D18, Oct. 1996.*

\* cited by examiner

*Primary Examiner*—James O. Hansen
(74) *Attorney, Agent, or Firm*—Patent & Trademark Services; Thomas Zack; Joseph H. McGlynn

(57) ABSTRACT

A waste organizing cabinet for recyclable materials. The upper working surface of the cabinet can be used to cut or otherwise treat food products. Below this upper surface is a first holding frame for a pull-out sliding drawer that rests on cabinet rails. Side meshed baskets placed within the holding frame form a series of separated compartments of the frame and placeable within each of the drawers. Each basket is used for separately receiving either: non recyclable waste food products, plastic materials, tin, glass, or paper products. Several different arrangements of the baskets within the drawer may be used to differently arrange the baskets within the framework of the drawer. As the frame and baskets are pulled out, spaced rails have stops to engage fixed frame rails to prevent further movement. Below this first drawer is a second slidable pull out drawer that may have several different holding frames compartments for the individual baskets. A plastic cutter with a surface scrapper can be used on the cabinet's upper work surface of the cabinet to, respectively, cut plastic products into pieces or scrap non-recyclable waste into one of the baskets below.

3 Claims, 5 Drawing Sheets

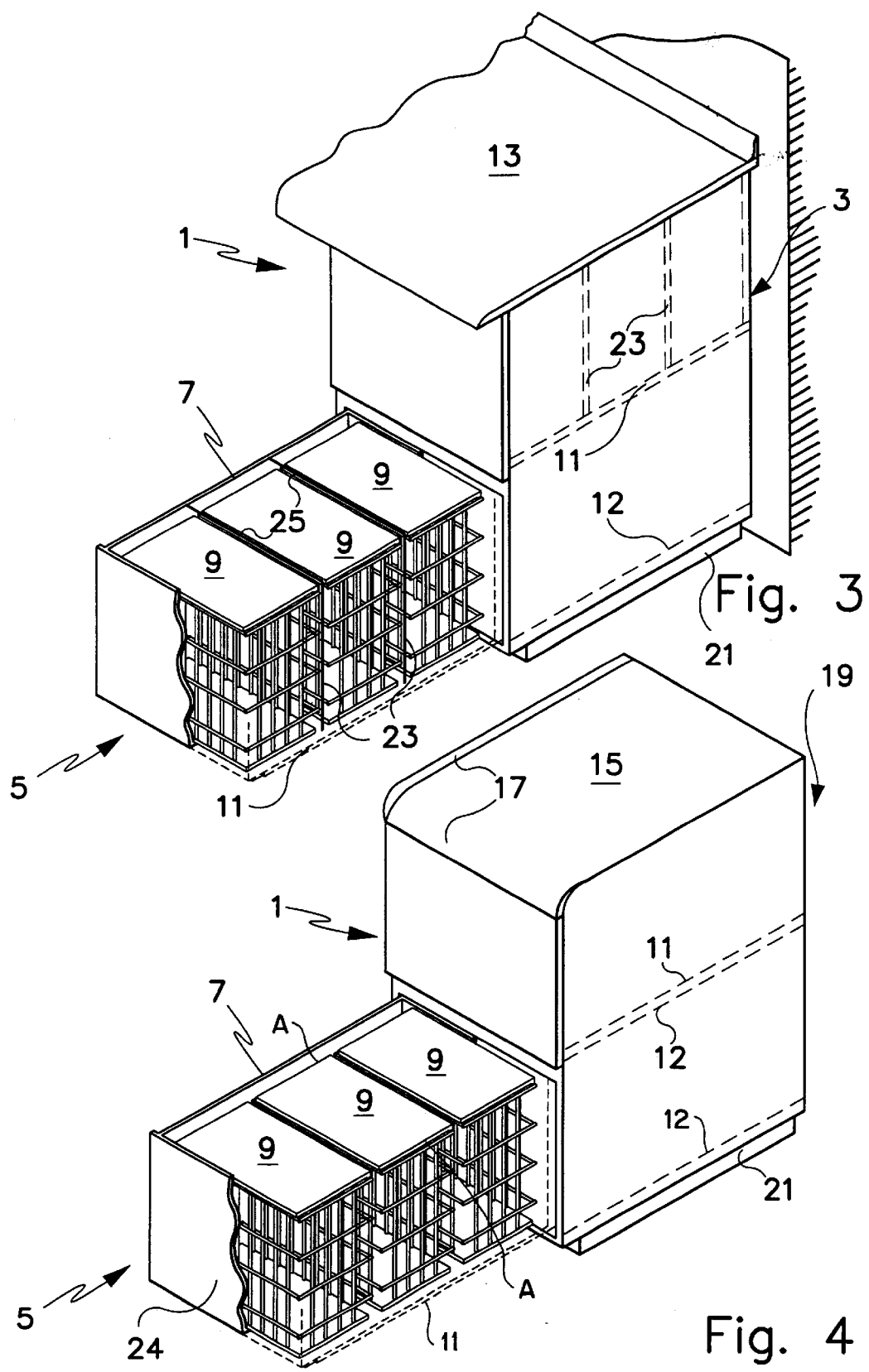

WASTE ORGANIZING CABINET

BACKGROUND OF THE INVENTION

This invention relates storage cabinet having slidable frame members into which meshed sided baskets may be placed. Recyclable materials may be separated and stored in each of the baskets until they are disposed.

The need for recycling materials for treatment and reuse is well known. In the most industrialized counties where relatively large amounts of recyclable items are used per capita this need is even greater than in other less developed counties having lower rates of recyclable consumption. Various measures have been proposed and instituted to address the recycling of materials especially from homes, schools, office buildings, stores educational institutions and other places frequented by the public.

Among the most common of these measures is the collection and processing of separated recyclable materials such as paper, glass, cans, and reusable plastic products and materials. While such efforts are commendable, there still is a need for the user to initially separate the recyclable products before they are collected and then processed. This initial separation can be done by simply placing the recyclable products into different bins or containers. However, to insure that the products to be recycled are actually separated and recycled by the initial user and not simply disposed of in the trash, the present invention was developed to provide for a more organized and convenient cabinet installed system that permits both the initial separating into individual basket containers and then the moving of the individual containers for each of the recyclable products all as will be described in detail hereafter.

DESCRIPTION OF THE PRIOR ART

Devices that are or can be used to segregate and hold recyclable products are known. For example, in the U.S. Pat. No. 5,221,010 to Bianco a cabinet has separate conduits whose openings are concealed which conduits lead to separate bins under the floor of the cabinet.

U.S. Pat. No. 5,503,287 to Gammons et al. discloses an lid and structural arrangement for recycling and refuse receptacles. The tops of the containers are inclined and locked to a structural ring and secured to side slatted type receptacles for recycled materials or refuse. A supporting post is also attached to each container ring.

U.S. Pat. No. 5,218,782 to Null et al. discloses a recycling bench apparatus having a rigid housing with a plurality of aligned compartments in adjacency to one another. A single lid may overlie the compartments or individual lids may be used with a pesticide fumigant to minimize insect infestation.

SUMMARY OF THE INVENTION

This invention relates to a storage cabinet for separating and storing recyclable products. Slidable frames acts as cabinet drawers to hold meshed removable baskets into which the recyclable products can be placed.

It is the primary object of the present invention to provide for an improved storage cabinet for recyclable products.

Another object is to provide for such a cabinet wherein individual drawers hold removable mesh baskets containing the individual type of recyclable products.

These and other objects and advantages of the present invention will become apparent to readers from a consideration of the ensuing description and the accompanying drawings.

BRIEF DESCRIPTION OF THE DRAWINGS

FIG. 3 is a perspective view of the FIG. 1 main kitchen cabinet with the lower drawer fully pulled out most of the way.

FIG. 4 is a perspective view of a stand alone waste organizing cabinet with the drawers similar to the like FIG. 3 view.

DESCRIPTION OF THE PREFERRED EMBODIMENT

Figure 1:
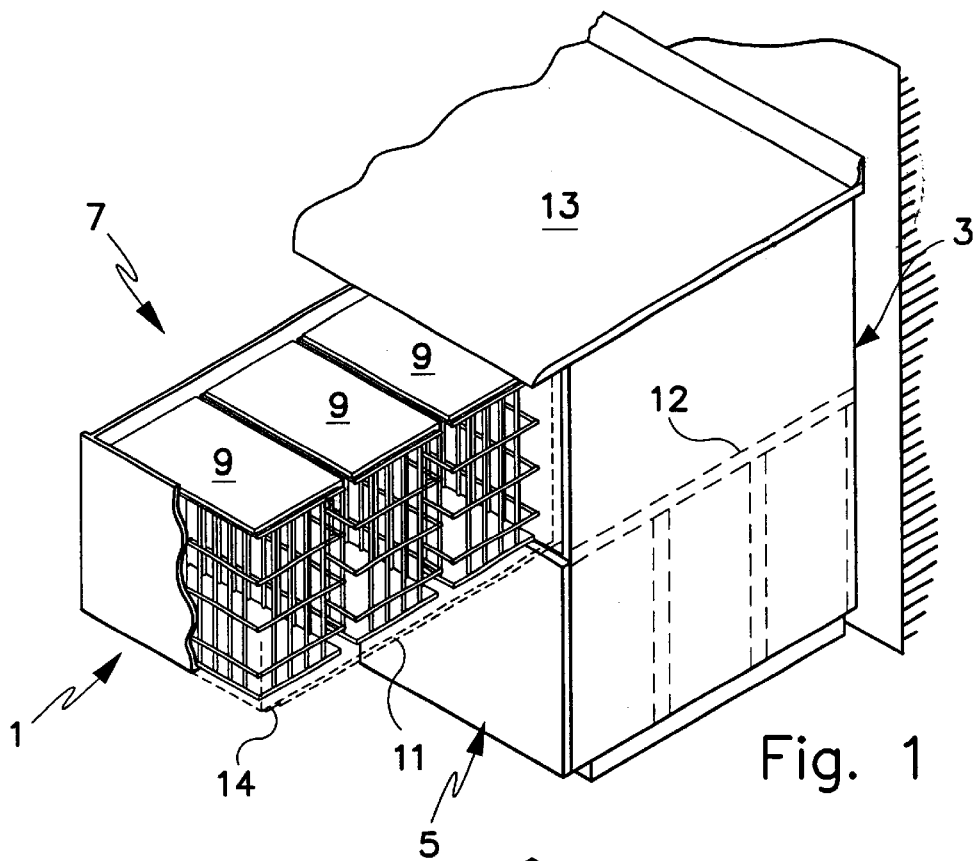
FIG. 1 is a perspective view of the present invention integrated into a main kitchen cabinet with the top drawer fully pulled out.

FIG. 1 is a perspective view of the present invention with the top cabinet drawer 1 fully pulled out away from the conventional fixed-to-the wall existing cabinet 3, partially shown. A similarly constructed lower drawer 5 in the cabinet is fully closed or fully pushed into the cabinet opening. Each drawer has a supporting opened holding cage-like frame 7 providing for the insertion of one or more different compartments. The frame 7 is constructed of rigid rod members joined together on four sides and the bottom in a box configuration with an opened top. Thus, the holding frame 7 (see FIGS. 5–6) has side defining rod frame members 8, spaced cross rod frame front and rear members 10 which extend across the front surface and the bottom surface and a bottom side joined rods 14 extending in the same direction as members 10.

The storage compartments are formed by an individual mesh side baskets 9 (see also FIG. 7) each one of which is used to hold one distinct type of recyclable product. The individual baskets 9 (one shown completely and two in outline format in FIG. 1) may be removable or inserted into their supporting frame 7 by lifting or placing them down, respectively, into the holding frame from above to bear against the frame's lower rod member 14. Each of the extended slidable drawers 1 and 5 have their frames 7 slide on spaced lower drawer rails 11. The rails 11 slide with the extended drawer frame. Another pair of lower rail sections 12 over which the rail sections 11 move are fixed to and within the hollow interior of the cabinet 3. The upper flat horizontal planar cabinet surface 13 forming part of the larger fixed kitchen cabinet surface (partially shown) may be used to cut or otherwise treat foods that are to be eaten.

Figure 2:
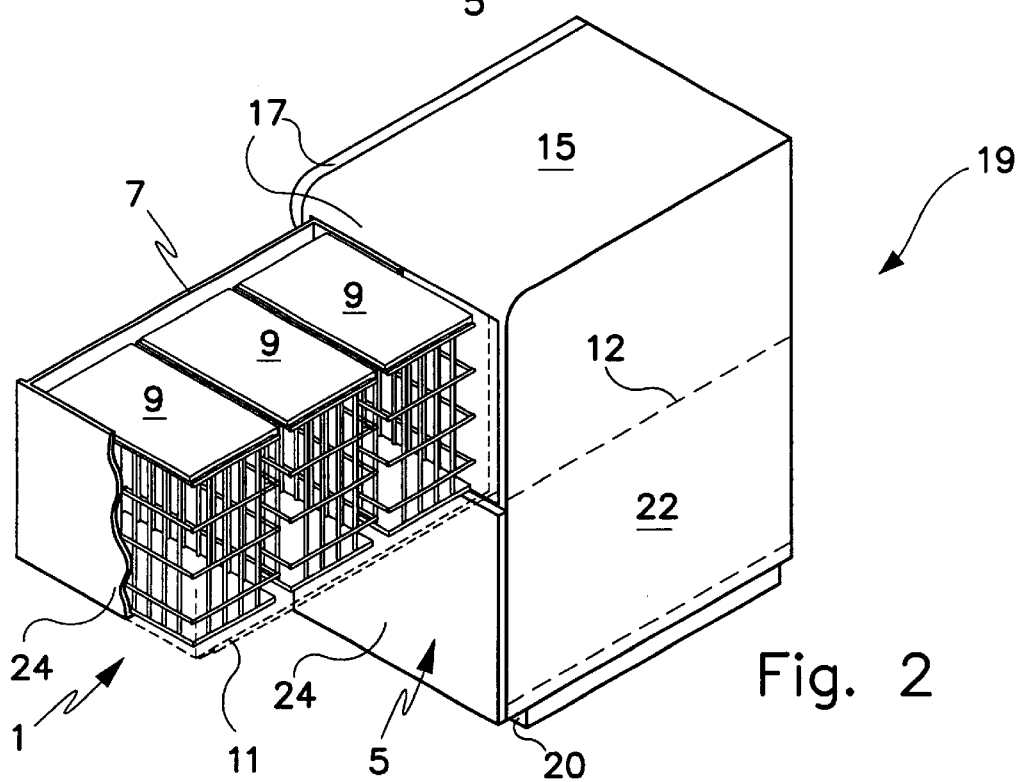
FIG. 2 is a perspective view of a stand alone waste organizing cabinet with the drawers similar to those in the FIG. 1 view.

FIG. 2 is a perspective view of a stand-alone waste organizing cabinet with the drawers in position similar to those in the FIG.1 view. In this second view three of the upper baskets 9 are seen supported by both their drawer's holding frame 7. Below the frames 7 are the supporting rail pair extensions 11 when the top or upper drawer 1 is fully pulled out from the cabinet 19. The top horizontal planar cabinet surface 15 is used for cutting food items, like fruits, vegetables, meats, etc.. To avoid spillage from food products, three edges 17 go around surface 15. On the front opening side, the edge 17 of the five sided supporting cabinet 19 extends past the vertical plane of the cabinet's two openings. Each cabinet 3 or 19 for FIGS. 1–4 is a box-like housing made of joined planar solid surfaces consisting of a bottom surface 20, two opposite side surfaces 22, the top surface 13 or 15, and a backing vertical surface opposite the vertical front side 24 split into two sections to cover each of the two drawer openings. The front side surfaces 24 are joined to and bear against the rod frame members 10. The cabinet's facing or front surfaces 24 and bottom surface 20 are made of a solid planar material such as plywood, chip board or any like rigid plastic material.

The two pairs of cabinet rails 12 are fixed to interior of the cabinet 19 extend horizontally along the lower edges of the openings used for the respective two drawers 1 and 5. The same number of upper rail sections 11, which slidably overlaps the fixed rail sections 12, move to carry the holding frames 7 when the drawers are pulled out. The rails 11 may have conventional end stops to prevent them from being disengaged with their respective lower supporting fixed rails 12. Each holding frame 7 is capable of supporting several individual baskets 9 within its cage-like confines and rides on a pair of spaced parallel rails 11. There is one frame 7 for each of the two drawers 1 and 5. A lower bottom spacer 21 extending around three sides of the cabinet 19 is attached to the cabinet's bottom planar surface to vertically raise the cabinet from the floor and to insure the bottom of the lower drawer 5 will not scrap against the floor when loaded and fully extended outwardly from the retaining cabinet 19.

FIG. 3 is a perspective view of the FIG. 1 main kitchen cabinet with the lower drawer 5 fully pulled out most of the way from the existing fixed-to-the-wall cabinet 3 (partially shown). Like the top drawer 1, individual mesh sided baskets 9 —three shown—are retained within the confines of the upper holding frame 7. optionally, the holding frame may have spaced side vertical members 23 between the adjacent baskets to separate them and horizontal upper spaced frame member 25 for the same purpose. In this figure the three baskets 9 are shown in the lower drawer, however, depending on the construction of the holding frame structure 7, the number, size and disposition of the individual baskets can be varied within each drawer. Normally, the holding frames 7 are identical for each of the drawers.

FIG. 4 is a perspective view of a stand-alone waste organizing cabinet 19 with the two drawers positioned similar to the drawers in the FIG. 3 view. Here again, the stand-along cabinet 19, like in FIG. 2, has an opened front face to allow the inserted drawers 1 or 5 to be positioned in or pulled out from the cabinet. Two pairs of holding frame supporting rails are both fixed to the interior hollow (rails 12) and extendable (rails 11) from the interior of cabinet 19. These rails extend along both sides of the cabinet with rails 12 being fixed to the sides to permit the supporting of the extendable overlapping rails 11. When the lower drawer 5 is pulled out from the cabinet 19, like drawer 1, the extendable rail section 11 moves over the fixed lower rail section 12 to support the holding frame 7. Clearly, the rails used to support the holding frame 7 could be positioned over the individuals drawers with the holding frames mounted on their extendible rail sections 11, however, this type of mount might interfere with the placement of the baskets 9 within their holding frame 7. Conventional retained ball bearings, rollers or other conventional friction reducing devices may be inserted between the sliding rails 11 and their fixed counterpart rail sections 12 to permit the easy slidable movement of rail section 11 and the carried holding frame 7. Like before the upper flat horizontal surface 15 is used to cut, chop or other treat fruit products and has three extending side cabinet edges 17 which form a border for the two drawer cabinet openings for drawers 1 and 5.

Figure 5:
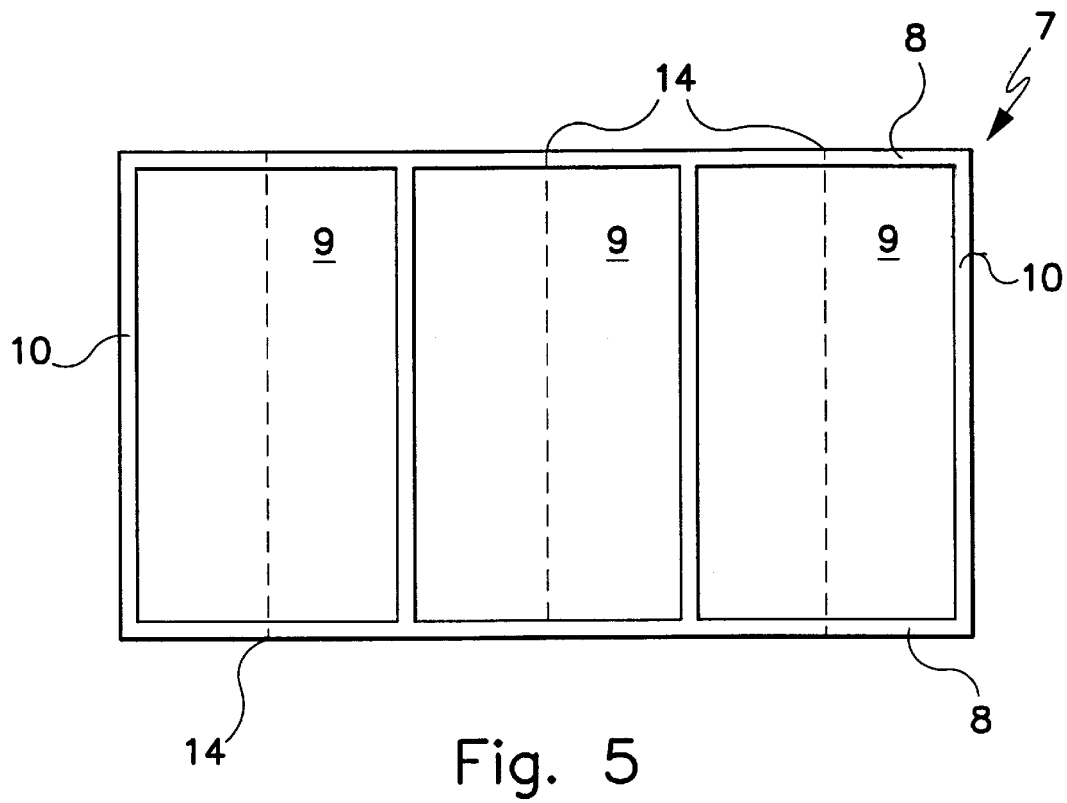
FIG. 5 is a top view of the baskets arranged in a first configuration.

FIG. 5 is a top view of the three baskets 9 arranged in a first configuration within the confines of supporting holder 7. In this arrangement no separating frame members 23 or 25 are used. The three baskets 9 are aligned parallel to each other which each basket being capable of receiving a different recyclable product. Both the top drawer 1 and bottom drawer 5, like those of FIGS. 1–4, could each have this type and number of baskets.

Figure 6:
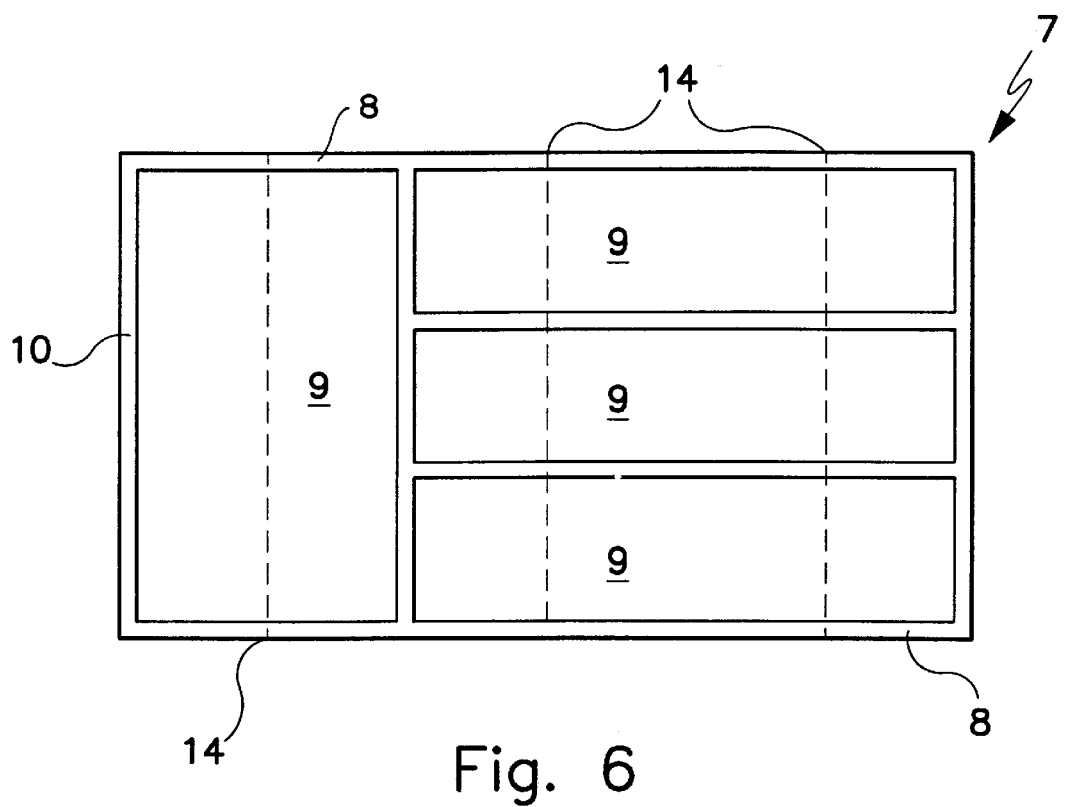
FIG. 6 is a top view of the baskets arranged in a second configuration.

FIG. 6 is a top view of the baskets arranged in a second configuration. This arrangement of the individual baskets 9 within the confines of the holding frame 7 could be used for only the top drawer 1 with the lower drawer 5 having no baskets 9 solid sides, a solid bottom and a solid front facing surface. With the four basket arrangement shown, the size of the four individual baskets 9 would be sized to take into consideration the confines of the holding frame 7. Thus, if the frames 7 in FIGS. 5 and 6 were the same dimensions, the four individual baskets in the latter figure would each be smaller in volume than each of the three baskets of FIG. 5. Variations in the size and shape of the individual baskets would as a result be dictated by the volume of the confining holding frame 7 and its shape, etc.

Figure 7:
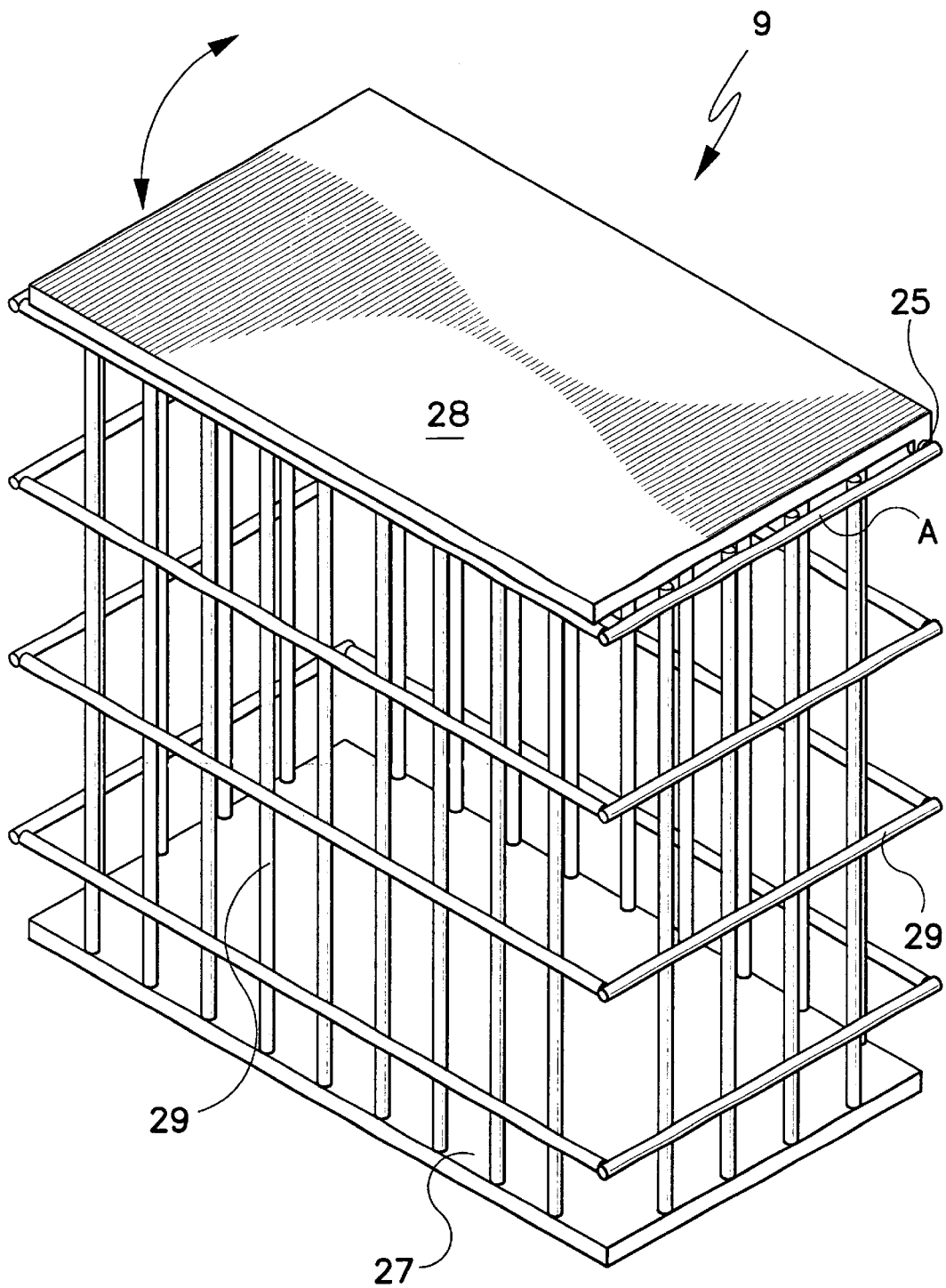
FIG. 7 is a perspective view of one of the individual baskets that can be inserted into a holding frame.

FIG. 7 is a perspective view of one of the individual baskets 9 that can be inserted into a holding frame 7. All of the baskets can be made substantially identical in construction. Typically they are made of a recyclable plastic material. The top surface 28 is made of a solid material that has a hinged edge 25 such that it may be opened to allow entry to the interior of the basket. The basket's bottom 27 is a solid surface. The four joining and connecting sides 29 of the basket are made of a mesh like material which permits air to enter and leave from the interior of the basket to dispense odors or gases given off by the decaying waste or materials stored. These sides are rigidly connected to the bottom surface 27 around its perimeter and the top hinge edge 25.

Figure 8:
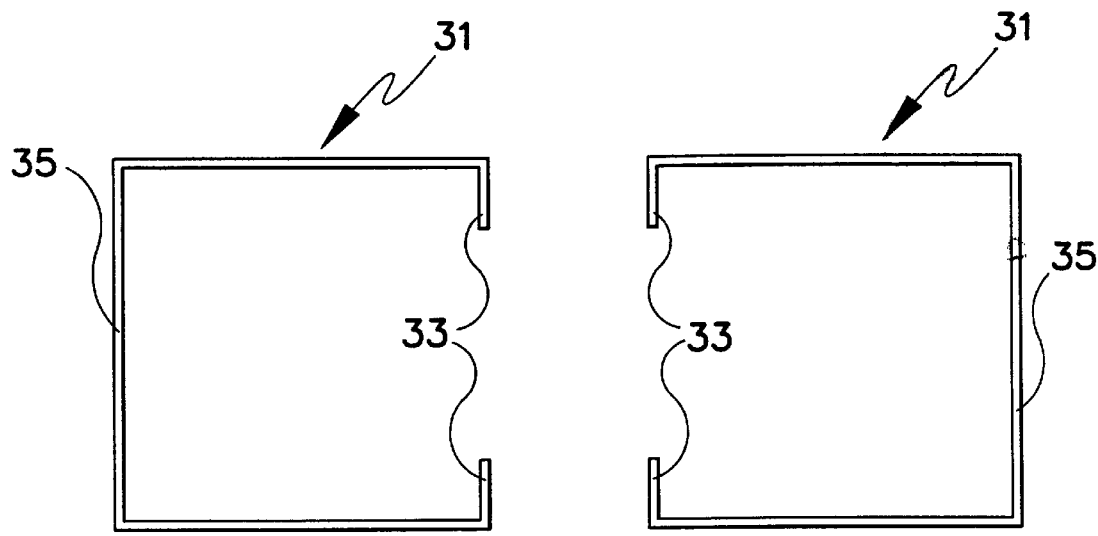
FIG. 8 is a top of the basket handles used with the basket of FIG. 7.

FIG. 8 is a top of the basket handles 31 that can be used with the basket of FIG. 7. The handles 31 are generally U-shaped in configuration and have two inwardly facing free ends 33. The free ends 33 engage the upper side portions of baskets 9 and may be hingedly attached to them. This allows the handles, one or two for each basket, to be folded down when not needed to lift the basket 9 from their holding frame 7. For example, the ends 33 could be hingedly fixed to the outside of the FIG.4 basket near the upper midsection at opposite side points A such that the handle's hand engaging leg 35 to extends across the width of top 28 parallel to the hinged edge 25. When folded down the handles leg 35 allows the top 28 to be opened. When the handles are lifted up they can carry the basket 9 and its contents from the frame 7.

Figure 9:
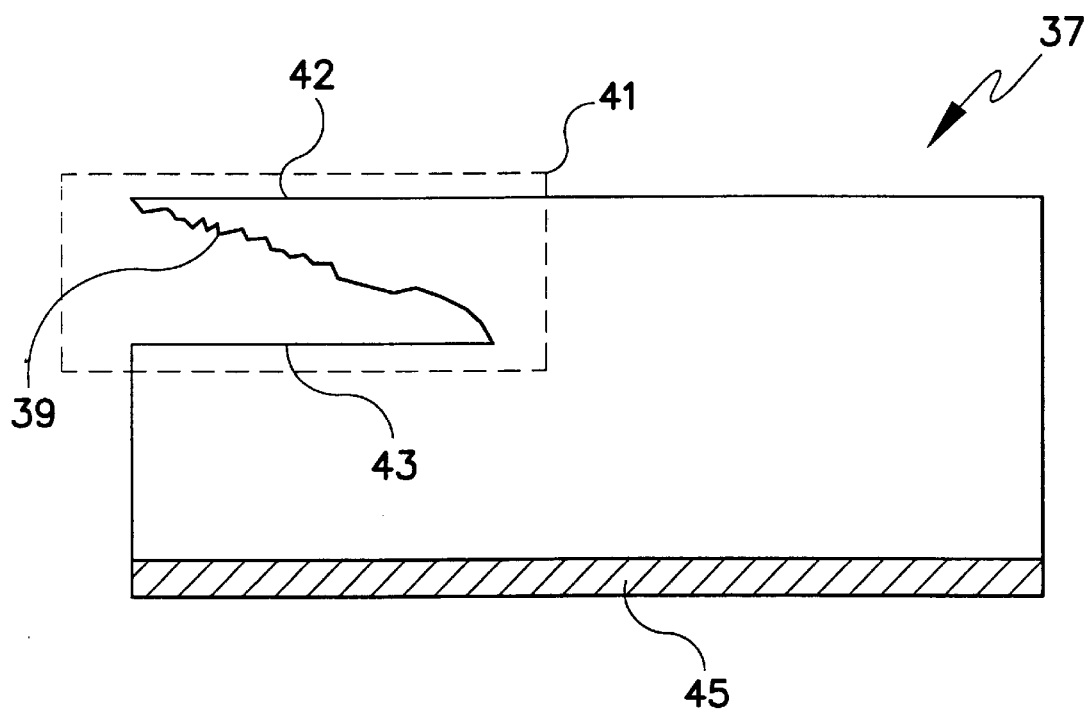
FIG. 9 is a side view of the cutter and surface scrapper used with the cabinet.

FIG. 9 is a side view of the cutter and surface scrapper 37 used with the cabinets shown in FIGS. 1–4. This accessory 37 is used to cut plastic materials, like bottles, into smaller pieces before storing the same in one of the baskets and to scrap and clean the cabinet's top surfaces 13 and 15 (see FIGS. 1–4). When the cutting edge 39 is not in use, a safety cover fits 41 (shown in dotted line format) over the edge to protect against its accidental actuation. By depressing the upper portion of the cutting edge 42, the edge surface 39 moves downwardly to engage the plastic object placed between the main body 43 of the member 37 and the edge 39. Extending along and fixed to the lower edge of body member 37 is a rubber scrapper 45 similar to a window washing rubber edge. By moving the body 37 with one's hand, the scrapper 45 can be used to place cabinet top waste materials or scraps from recyclable materials into the individual baskets 9.

In one working embodiment of the invention, all the baskets 9 had the same volume and were (in inches) 6 by 14 on top, 5.5 by 13 on the bottom and 15 high. Color coding can be used to make identification of the individual baskets 9 easier. While 3 baskets were inserted in each drawer 1 and 5 of this embodiment, the actual number and their placement within the frame 7 can vary as desired by selecting appropriate dimensions. For the paper recycling basket paper bags can be used in the mesh sided basket 9 if desired.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A waste organizing unit comprising:

a first rigid holding frame assembly for retaining a plurality of individual baskets, said frame assembly having side defining frame members, spaced cross frame members, and a joined front surface and bottom surface;

a cabinet having an upper work surface and internal supports to slidably receive and vertically support said first holding frame assembly; and a first set of individual substantially identical baskets each of which is adapted to receive recyclable products, each of said baskets being insertable into the holding frame assembly between the frame's spaced cross frame members to move with the holding frame relative to the cabinet;

each of said first set of baskets having four joined meshed sides, an openable top mounted on the sides and a closed bottom surface under the sides;

a second rigid holding frame assembly for retaining a plurality of individual baskets, said second holding frame assembly having side defining frame members, spaced cross frame members, and a joined front surface and bottom surface;

said cabinet having a second set of internal supports to slidably receive and vertically support said second holding frame assembly;

a second set of individual substantially identical baskets each of which baskets is adapted to receive either waste or recyclable products, each of said second set of baskets being insertable into the second holding frame assembly between the second frame's spaced cross frame members to move with the second frame assembly in the second set of internal supports relative to the cabinet;

each of said second set of baskets having four joined meshed sides, an openable top mounted on the sides and a closed bottom surface under the sides; and the openable top surface of each of the baskets in said first set and second set having a hinge joined to the meshed sides.

2. The waste organizing unit as claimed in claim 1, wherein there are more than three baskets in said first and second set of baskets.

3. The waste organizing unit as claimed in claim 1, wherein said cabinet's upper work surface is fixedly secured to an existing counter.

* * * * *